United States Patent
Wu

(10) Patent No.: US 6,487,963 B1
(45) Date of Patent: Dec. 3, 2002

(54) GRILL DEVICE HAVING A RESTRICTING UNIT TO PREVENT UPWARD MOVEMENT OF AN UPPER GRILL UNIT RELATIVE TO A LOWER GRILL UNIT

(75) Inventor: Tsan-Kuen Wu, Tainan Hsien (TW)

(73) Assignee: Eupa International Corporation, Las Vegas, NV (US)

( * ) Notice: Subject to any disclaimer, the term of this patent is extended or adjusted under 35 U.S.C. 154(b) by 0 days.

(21) Appl. No.: 10/160,781

(22) Filed: May 31, 2002

(51) Int. Cl.⁷ .......................... A47J 37/00; A47J 37/04; A47J 37/06; A47J 37/08; A23L 1/00
(52) U.S. Cl. ........................ 99/340; 99/349; 99/355; 99/372; 99/374; 99/375; 99/378; 99/425; 99/445; 99/446; 99/400
(58) Field of Search ....................... 99/331–333, 339, 99/340, 349–351, 352–355, 372–382, 400, 401, 444–450, 422–425, 481, 482; 126/20, 369, 41 R, 25 R; 219/521, 524, 525, 586, 401; 426/523

(56) References Cited

U.S. PATENT DOCUMENTS

| | | | | |
|---|---|---|---|---|
| 3,068,778 A | * | 12/1962 | Majerus | 99/380 |
| 5,129,313 A | * | 7/1992 | Coppier | 99/376 |
| 5,606,905 A | * | 3/1997 | Boehm et al. | 99/375 |
| 5,615,604 A | * | 4/1997 | Chenglin | 99/332 |
| 5,845,562 A | * | 12/1998 | Deni et al. | 99/375 |
| 5,848,567 A | * | 12/1998 | Chiang | 99/375 |
| 5,890,419 A | * | 4/1999 | Moravec | 99/349 |
| 6,012,380 A | * | 1/2000 | Hermansson | 99/337 |
| 6,170,389 B1 | * | 1/2001 | Brady | 99/332 |
| 6,257,126 B1 | * | 7/2001 | Veljkovic et al. | 99/349 |
| 6,269,738 B1 | * | 8/2001 | Huang | 99/375 |
| 6,276,263 B1 | * | 8/2001 | Huang | 99/375 |
| 6,389,959 B1 | * | 5/2002 | Robertson | 99/331 |

* cited by examiner

Primary Examiner—Timothy F. Simone
(74) Attorney, Agent, or Firm—Harness, Dickey & Pierce, P.L.C.

(57) ABSTRACT

A grill device includes a connecting unit which pivotally connects upper and lower grill units. A restricting unit includes a spring-biased restricting element disposed movably in the connecting unit, and is movable between a limiting position, in which, the restricting element is disposed above and is vertically aligned with pivots of the upper grill unit so as to prevent vertical movement of the upper grill unit relative to the lower grill unit, and a non-limiting position, in which, the upper grill unit is permitted to move vertically

3 Claims, 8 Drawing Sheets

GRILL DEVICE HAVING A RESTRICTING UNIT TO PREVENT UPWARD MOVEMENT OF AN UPPER GRILL UNIT RELATIVE TO A LOWER GRILL UNIT

BACKGROUND OF THE INVENTION

1. Field of the Invention

The invention relates to a grill device, more particularly to a grill device having a restricting unit to prevent upward movement of an upper grill unit relative to a lower grill unit during the grilling operation.

2. Description of the Related Art

Referring to FIG. 1, a conventional grill device 1 is shown to include a lower grill unit 11 with a rear end 113, an upper grill unit 12 with a rear end 123, and a connecting unit which interconnects the rear ends 123,113 of the upper and lower grill units 12,11 in such a manner that the upper grill unit 12 can be turned rearward relative to the lower grill unit 11 from a closed position to an open position, in which the upper grill unit 12 is generally perpendicular to the lower grill.. unit 11. The upper and lower grill units 12, 11 respectively have upper and lower cooking members 121, 111.

As illustrated, the connecting unit includes a pivot seat 131 which is fixed on and which extends upwardly from the rear end 113 of the lower grill unit 11 and which has opposite left and right sides 130 that are respectively formed with vertical slots 132, and left and right cylindrical pivots 133 which are fixed on the rear end 123 of the upper grill unit 12 and which extend into the slots 132 in the lower grill unit 11. By virtue of the connecting unit, the upper grill unit 12 is movable vertically relative to the lower grill unit 11 so as to accommodate the thickness of food, e.g., a piece of meat, confined between the upper and lower grill units 12, 11.

One disadvantage encountered during use of the aforesaid conventional grill device 1 is that, though the upper cooking member 121 can be adjusted to prevent vertical movement relative to the lower cooking member 111, a sandwich placed on the lower cooking member 111 can not be cut into two halves due to lack of cutting blades in the cooking members 111, 121, thereby resulting in purchase of another set of cooking members which cooperatively can cut a piece of bread being grilled therebetween.

SUMMARY OF THE INVENTION

The object of this invention is to provide a grill device with a restricting unit that can eliminate the occurrence of the aforesaid disadvantage which result during use of the conventional grill device.

Accordingly, a grill device of the present invention includes a lower grill unit, an upper grill unit, a connecting unit, and a restricting unit.. The lower grill unit has a rear portion and an upper surface that is indented to form a recess, and includes a lower cooking member detachably mounted in the recess. The rear portion of the lower grill unit is formed with a horizontally extending rear notch, and has an abutment wall that separates the rear notch from the recess, that confines a rear side of the recess, and that is formed with a horizontal slot in spatial communication with the recess and the rear notch. The upper grill unit has a rear portion that is pivoted to the lower grill unit so as to rotate relative to the lower grill unit between open and closed positions. The connecting unit includes a hollow pivot seat secured to the rear portion, disposed in the rear notch in the lower grill unit, and confining a receiving space. The pivot seat has left and right open ends in spatial communication with the receiving space. Left and right pivots are fixed to the rear portion of the upper grill unit, and respectively extend into the receiving space via the left and right open ends of the pivot seat so as to permit rotation of the upper grill unit relative to the lower grill unit and vertical movement of the upper grill unit together with the left and right pivots along vertical lengths of the left and right open ends of the pivot seat when the upper grill unit is positioned at the closed position. The restricting unit includes a pressing element and a spring-biased restricting element. The pressing element projects from the lower cooking member, and is extendible into the receiving space in the pivot seat via the horizontal slot when the lower cooking member is mounted in the recess. The restricting element is disposed above the left and right pivots, and is pressable by the pressing element when the lower cooking member is disposed in the recess so as to move in a transverse direction relative to the length of the pivot seat to a limiting position, in which, the restricting element is vertically aligned with the left and right pivots, thereby restricting vertical movement of the upper grill unit and the left and right pivots when the upper grill unit is positioned at the closed position.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
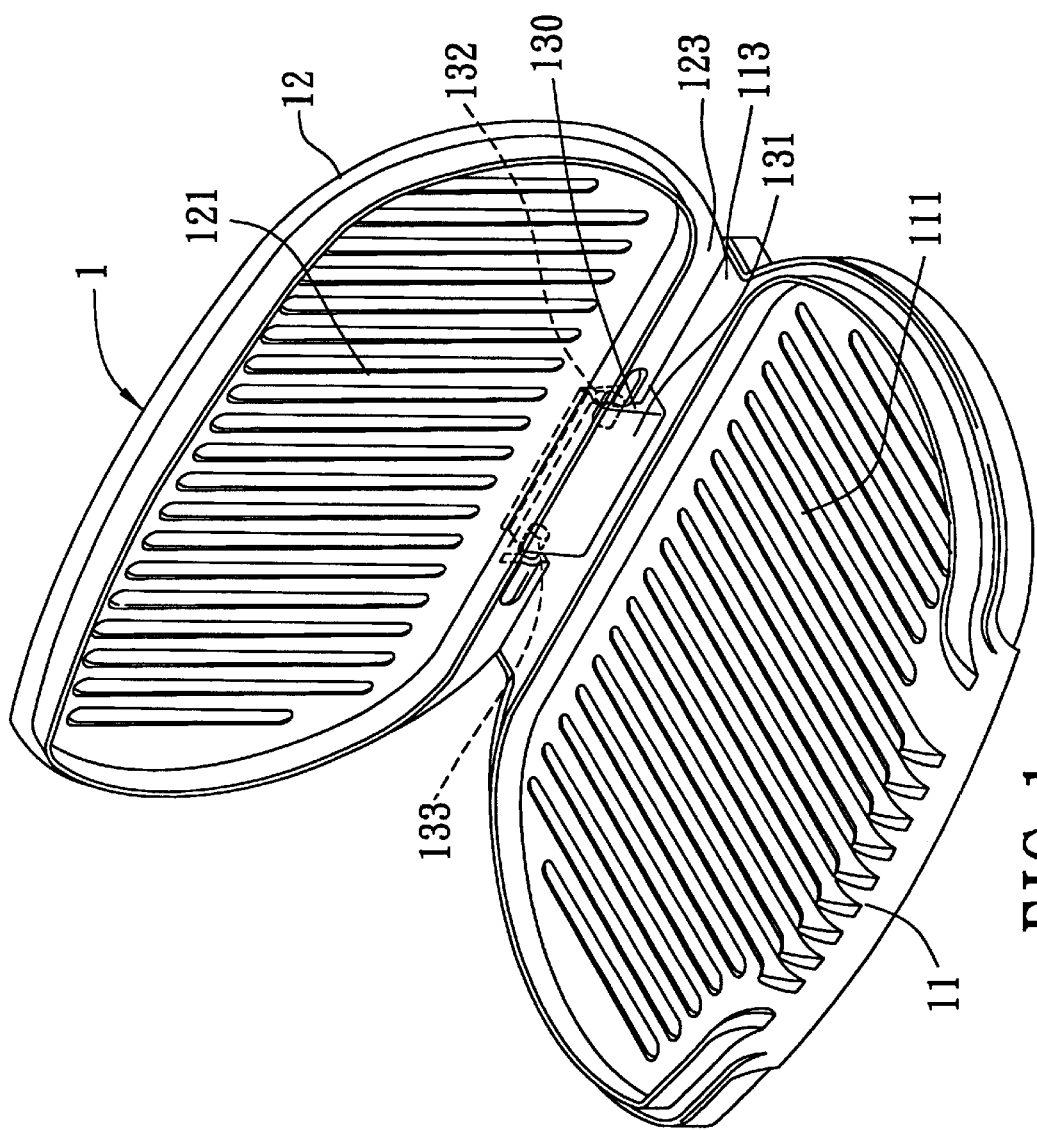
FIG. 1 is a perspective view of a conventional grill device at an open position.
Figure 2:
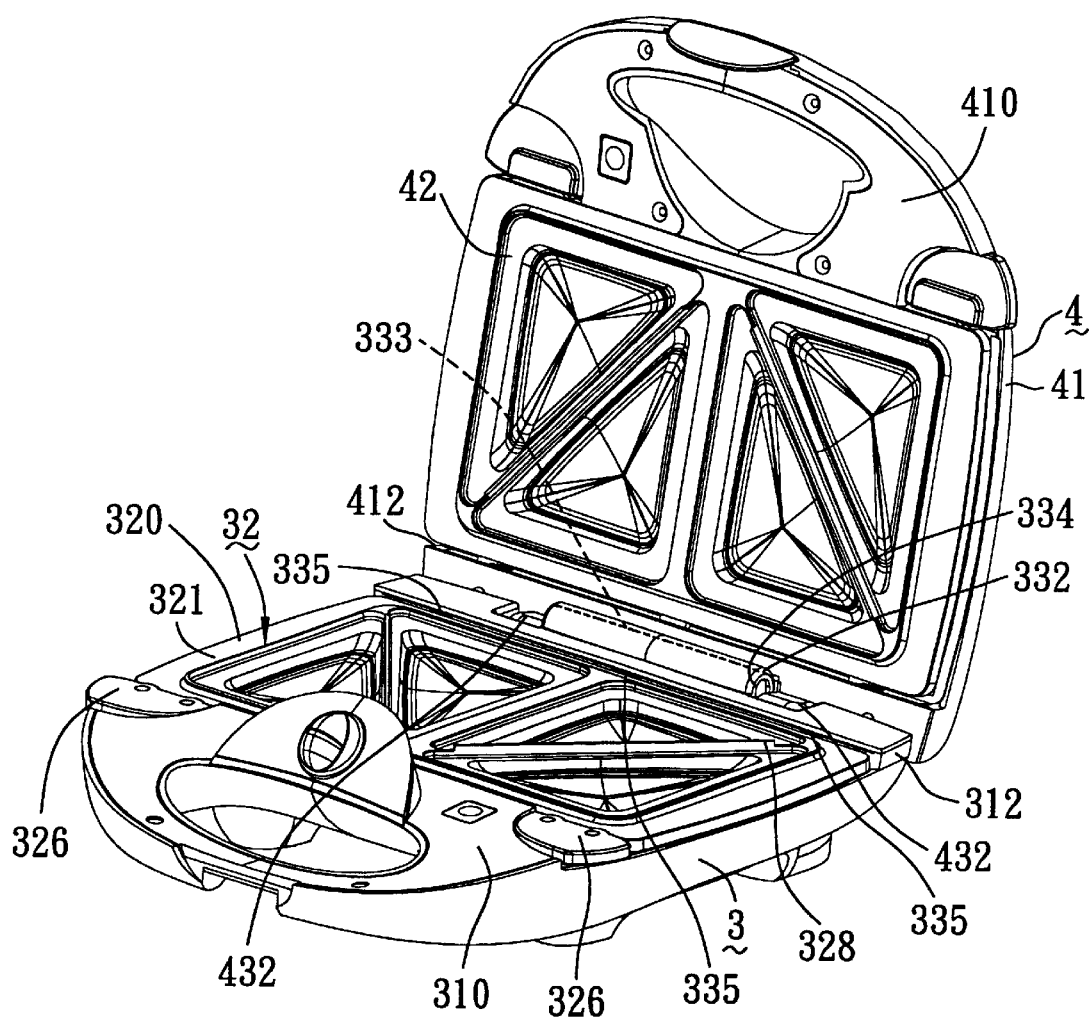
FIG. 2 is a perspective view of the preferred embodiment of a grill device according to the present invention at an open position.
Figure 3:
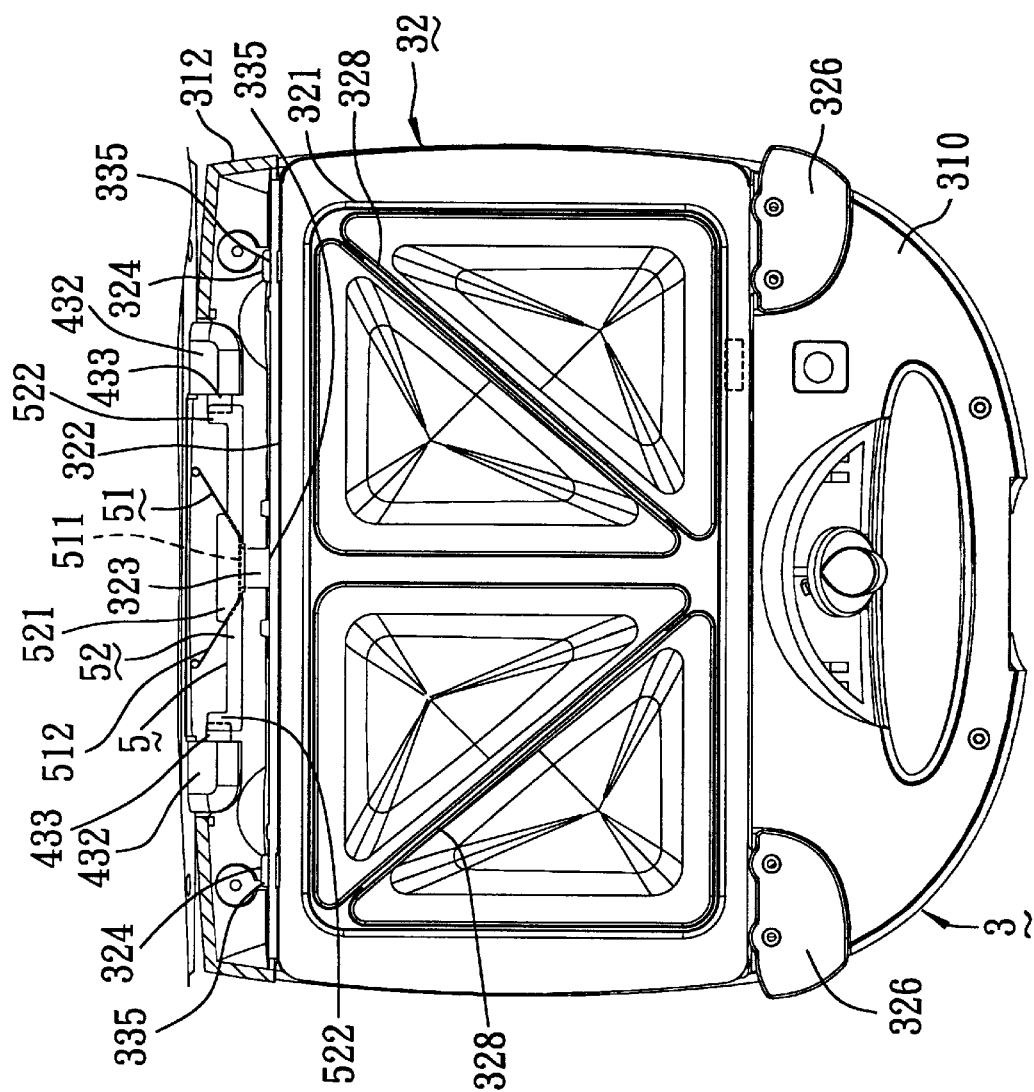
FIG. 3 is a top planar view of the preferred embodiment, in which, a rear portion of the grill device is cut away to illustrate how an upper grill unit is prevented from upward movement relative to a lower grill unit.

Referring to FIGS. 2 to 4A and 4B, the preferred embodiment of a grill device 1 of this invention is shown to include a lower grill unit 3, an upper grill unit 4, a connecting unit, and a restricting unit 5.

As illustrated, the lower grill unit 3 has a rear portion 312 and an upper surface 320 that is indented to form a recess 321, and includes a lower cooking member 32 detachably mounted in the recess 321. The rear portion 312 is formed with a horizontally extending rear notch 432, and has an abutment wall that separates the rear notch 432 from the recess 321, that confines a rear side of the recess 321, and that is formed with a horizontal slot 335 in spatial communication with the recess 321 and the rear notch 432.

The upper grill unit 4 has a rear portion 412 that is pivoted to the lower grill unit 3 so as to rotate relative to the lower grill unit 3 between open and closed positions. The upper grill unit 4 has a bottom 41 provided with an upper cooking member 42 which is configured to be symmetrical to the lower cooking member 32. The upper and lower grill units 4, 3 have front portions 310, 410 which are opposite to the rear portions 312, 412 and which are formed with finger-holes therethrough to facilitate opening of the upper grill unit 4 relative to the lower grill unit 3 and carrying of the grill device when the upper and lower grill units 4, 3 are disposed at the closed position. The front portion 310 of the lower grill unit 3 is further formed with left and right spring-biased locking plates 326 which releasably lock the lower cooking member 32 relative to the front portion 310 so as to enhance stability of the lower cooking member 32 in the recess 321, thereby preventing untimely removal of the lower cooking member 32 from the recess 321.

The connecting unit includes a hollow pivot seat 332, and left and right pivots 433. The pivot seat 332 is secured to the rear portion 312, is disposed in the rear notch 432 in the lower grill unit 3, and confines a receiving space 333. The pivot seat 332 has left and right open ends 334 of elliptical shape in spatial communication with the receiving space 333. The left and right pivots 433 are fixed to the rear portion 412 of the upper grill unit 4, and respectively extend into the receiving space 333 via the left and right open ends 334 of the pivot seat 332 so as to permit rotation of the upper grill unit 4 relative to the lower grill unit 3 and vertical movement of the upper grill unit 4 together with the left and right pivots 433 along the vertical lengths of the left and right open ends 334 of the pivot seat 332 when the upper grill unit 4 is positioned at the closed position.

Figure 4A:
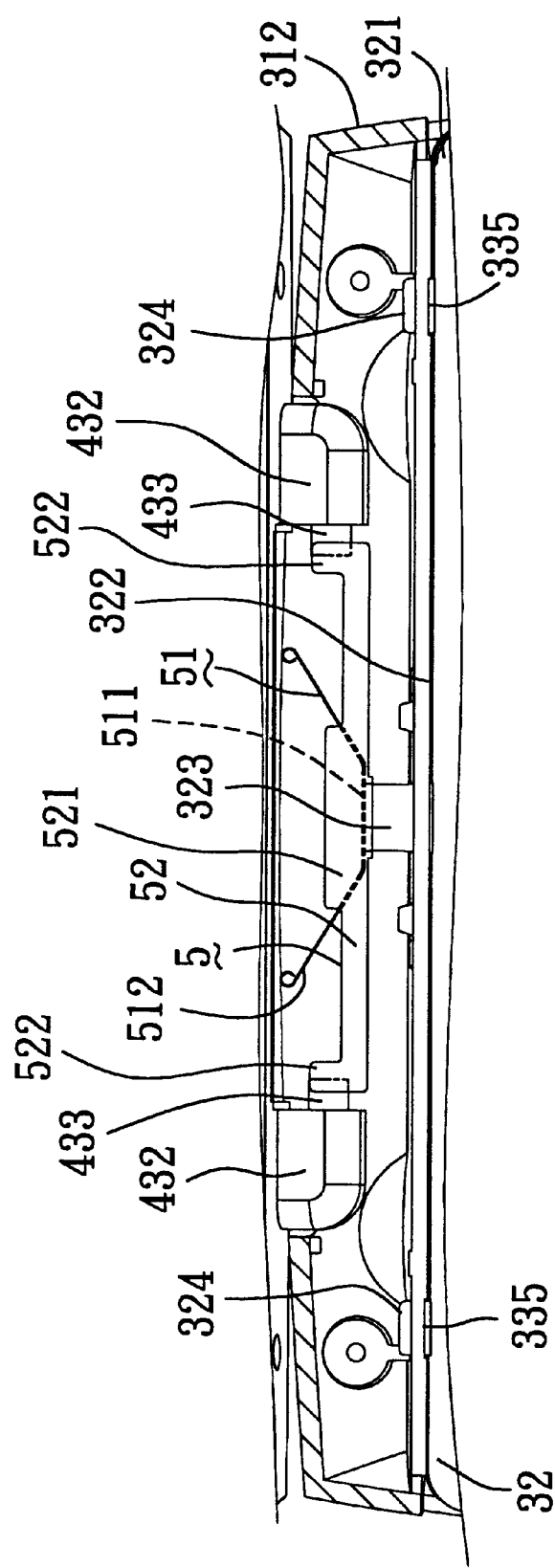
FIG. 4A is an enlarged fragmentary top planer view of the preferred embodiment, illustrating how the upper grill unit is prevented from upward movement relative to the lower grill unit.
Figure 4B:
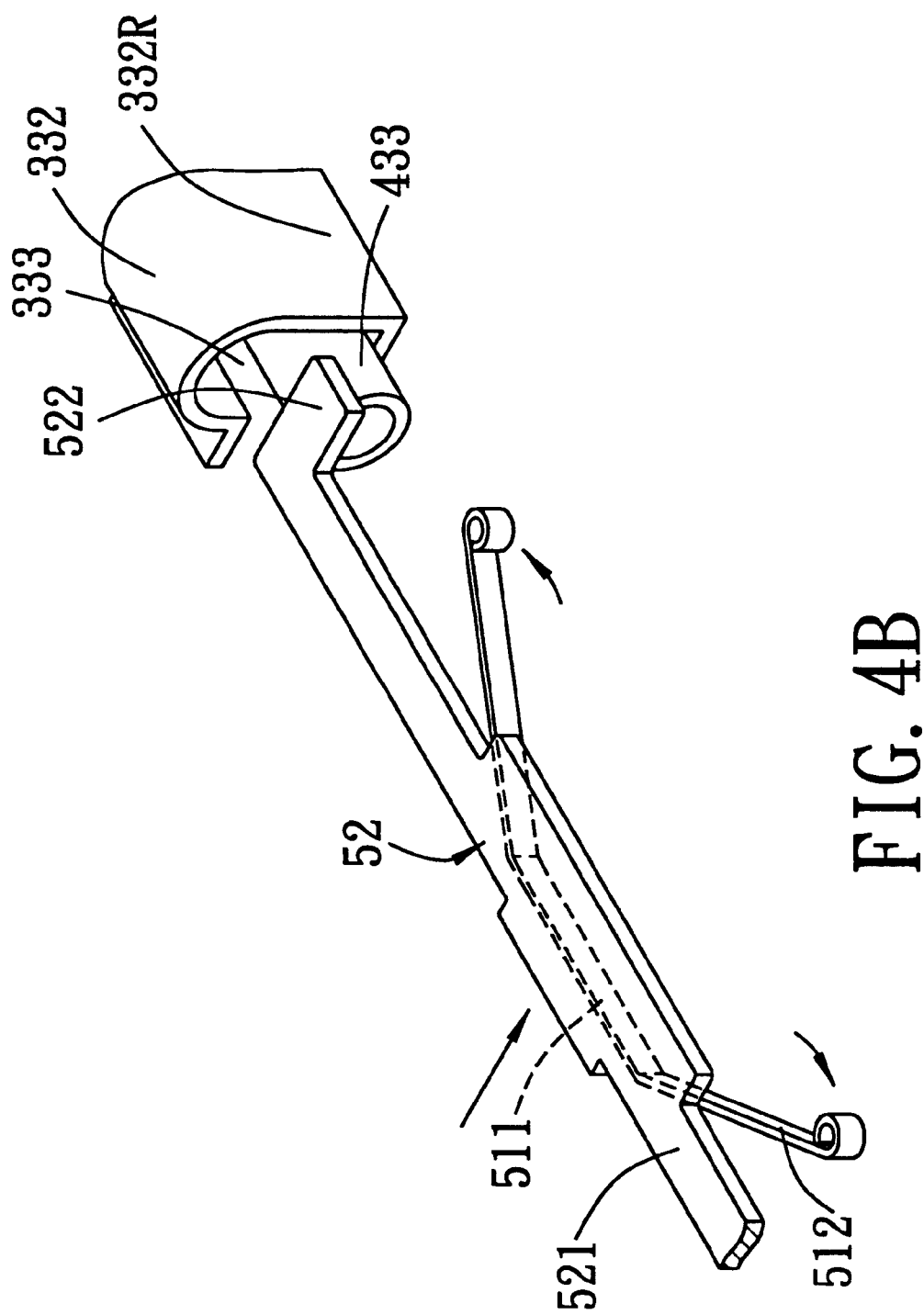
FIG. 4B is an enlarged fragmentary sectional view of the preferred embodiment, illustrating how the upper grill unit is prevented from upward movement relative to the lower grill unit.

The restricting unit 5 includes a pressing element 323 and a spring-biased restricting element 52. The pressing element 323 projects from the lower cooking member 32, and is extendible into the receiving space 333 in the pivot seat 332 via the horizontal slot 335 when the lower cooking member 32 is mounted in the recess 321. The spring-biased restricting element 52 is disposed above the left and right pivots 433, and is pressable by the pressing element 323 when the lower cooking member 32 is disposed in the recess 321 so as to move in a transverse direction relative to the length of the pivot seat 332 to a limiting position, in which, the restricting element 52 is vertically aligned with the left and right pivots 433, as best shown in FIGS. 4A and 4B, thereby restricting vertical movement of the upper grill unit 4 and the left and right pivots 433 when the upper grill unit 4 is positioned at the closed position. Note that the restricting element 52 is limited to move upward and downward.

The restricting element 52 includes a restricting plate 521 that has two opposite ends, and two limiting tabs 522 which respectively project from the opposite ends in the transverse direction and which are vertically aligned with the left and right pivots 433 when the restricting element 52 is at the limiting position.

Figure 5:
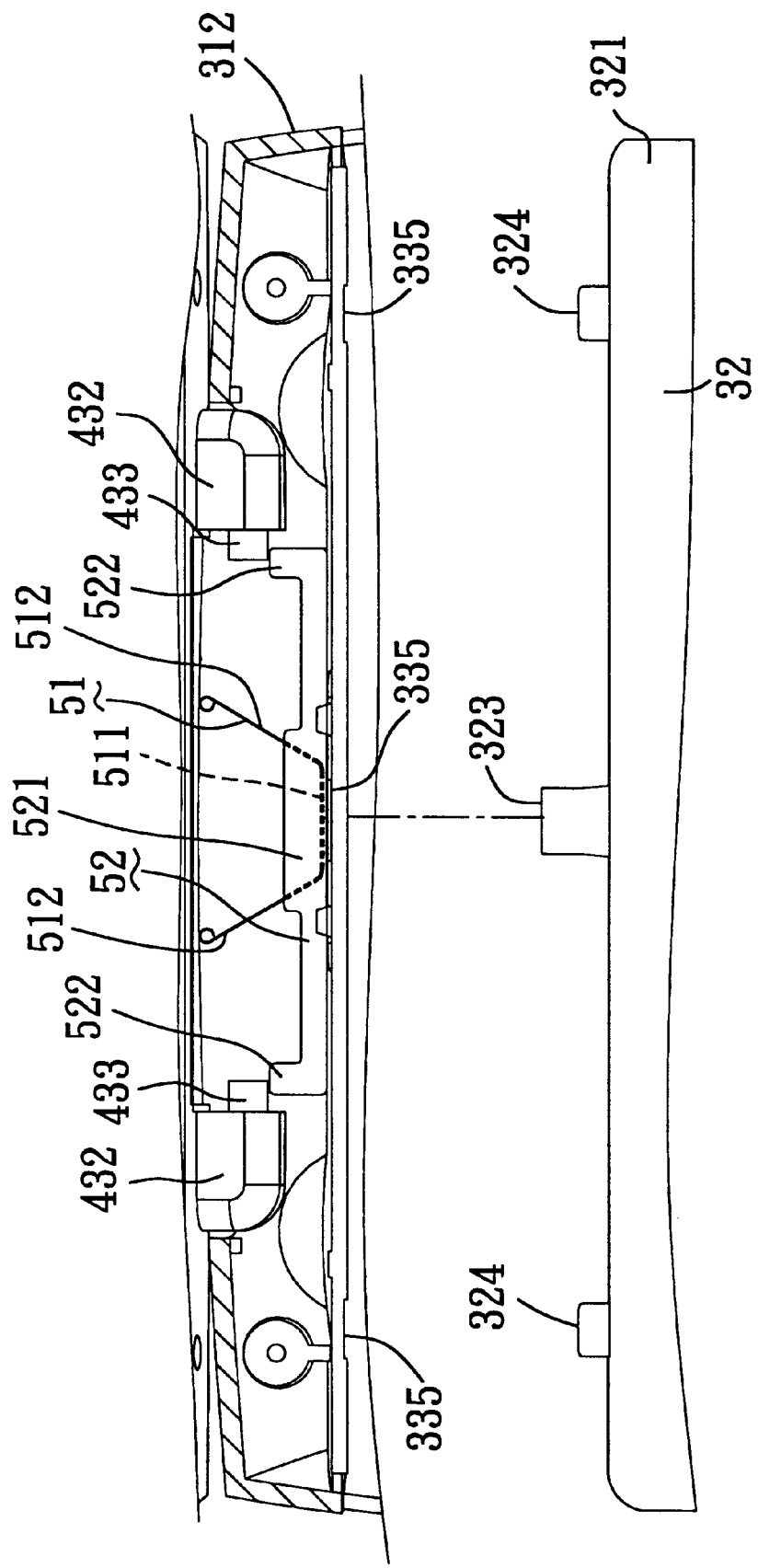
FIG. 5 is an enlarged fragmentary top planer view of the preferred embodiment, illustrating how the upper grill unit is permitted to move upward relative to the lower grill unit upon removal of a lower cooking member from the lower grill unit.

In this embodiment, the restricting unit 5 further includes a pair of engaging tongues 324 which project from the lower cooking member 32, which are disposed at left and right sides of the pressing element 323 in parallel manner, and which extend into the horizontal slot 335 so as to enhance positioning of the lower cooking member 32 in the recess 321. Preferably, the pivot seat 332 has a space-confining wall that confines the receiving space 333 and that has a rear wall portion 332R. The restricting element 52 further includes an inverted U-shaped spring member 51 that has a bight portion 511 connected to the restricting plate 521, and two opposing arm portions 512 that diverge rearwardly from the bight portion 511 to slidably contact the rear wall portion 332R of the space-confining wall so as to urge the restricting element 52 to move from the limiting position in FIGS. 4A and 4B to a non-limiting position, in which, the limiting tabs 522 are moved forward to be offset from the left and right pivots 433 (see FIG. 5), upon removal of the lower cooking member 32 from the recess 321. The spring member 51 is pressable by the pressing element 323 when the lower cooking member 32 is mounted in the recess 321 so as to permit movement of the restricting element 52 to the limiting position.

The lower cooking member 32 defines two rectangular cooking spaces, each of which is confined by a space-confining wall portion thereof. Two cutting knives 328 are disposed in the cooking spaces in diagonal positions for cutting two sandwiches into four pieces of triangular shape when the upper grill unit 4 is disposed at the closed position.

Figure 6:
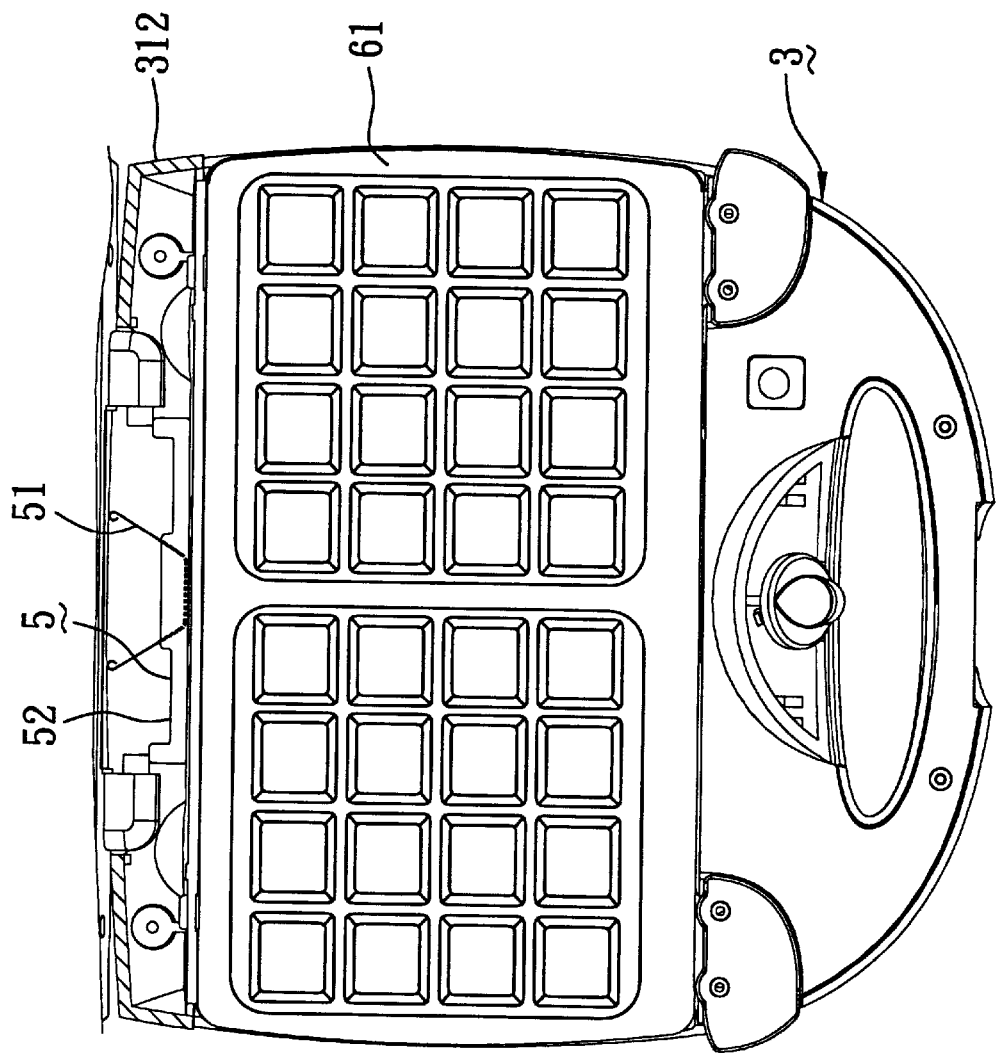
FIG. 6 is a top planar view of another preferred embodiment of a grill device of the present invention, in which a rear portion of the grill device is cut away to illustrate how an upper grill unit is permitted upward movement relative to a lower grill unit.
Figure 7:
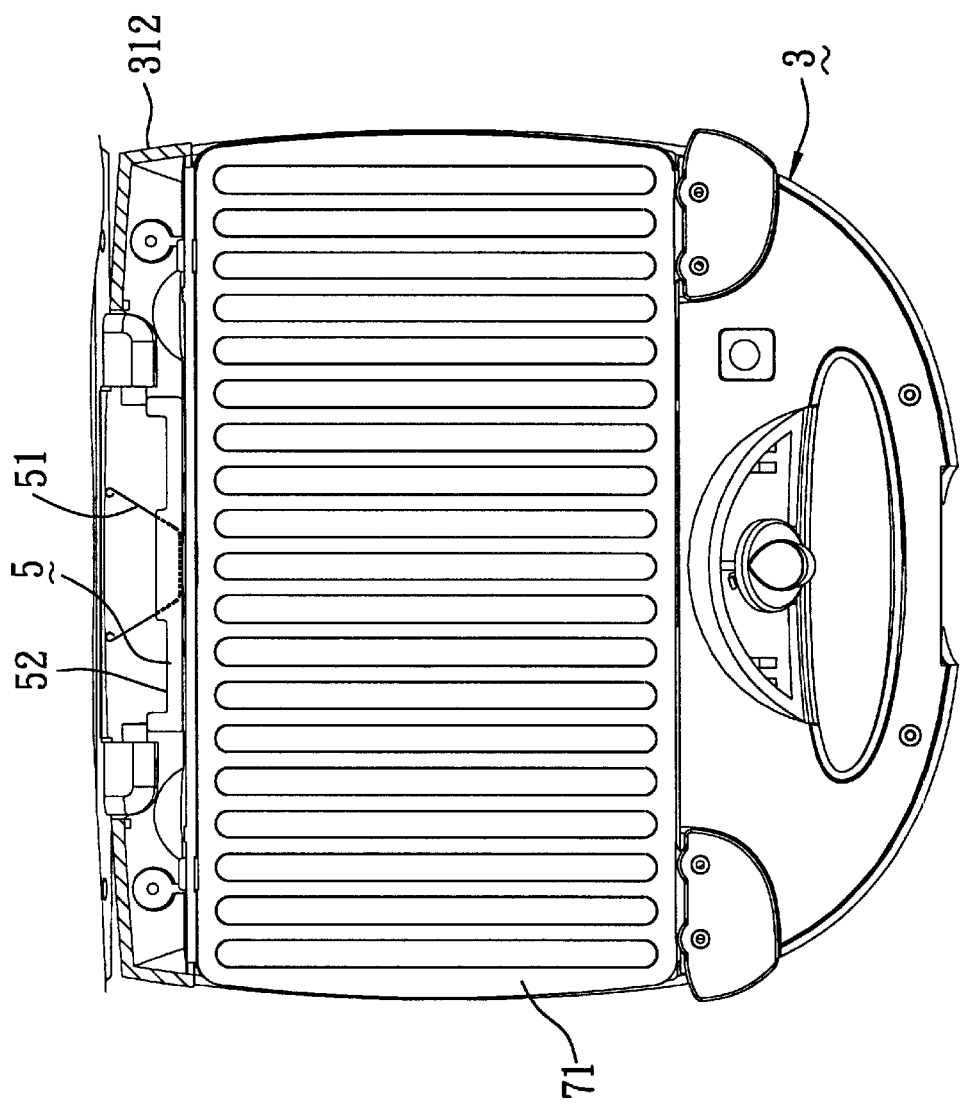
FIG. 7 is a top planar view of still another preferred embodiment of the grill device, in which a rear portion of the grill unit is cut a way to illustrate how an upper grill unit is permitted upward movement relative to a lower grill unit.

Referring to FIGS. 6 and 7, two modified preferred embodiments of the present invention are shown to have structures similar to the previous embodiment. The main difference resides in that the lower cooking members 61, 71 in FIGS. 6 and 7 are not formed with the pressing elements, and are intended for grilling food that does not require cutting during or after the grilling operation. Under this condition, the restricting element 52 is constantly urged by the spring member 51 so as to be positioned at the non-limiting position.

With this invention thus explained, it is apparent that numerous modifications and variations can be made without departing from the scope and spirit of this invention. It is, therefore intended that this invention be limited only as indicated in the appended claims.

I claim:

1. A grill device comprising:

a lower grill unit having a rear portion and an upper surface that is indented to form a recess, and including a lower cooking member detachably mounted in the recess, the rear portion being formed with a horizontally extending rear notch, and having an abutment wall that separates the recess from the rear notch and that is formed with a horizontal slot in spatial communication with the recess and the rear notch;

an upper grill unit having a rear portion that is pivoted to the lower grill unit so as to rotate relative to the lower grill unit between open and closed positions;

a connecting unit including
a hollow pivot seat secured to the rear portion, disposed in the rear notch of the lower grill unit, confining a receiving space, and having left and right open ends;
left and right pivots fixed to the rear portion of the upper grill unit and respectively extending into the receiving space via the left and right open ends of the pivot seat so as to permit rotation of the upper grill unit relative to the lower grill unit and vertical movement of the upper grill unit together with the left and right pivots along vertical lengths of the left and right open ends of the pivot seat when the upper grill unit is positioned at the closed position; and a restricting unit including a pressing element projecting from the lower cooking member and extendible into the receiving space in the pivot seat via the horizontal slot when the lower cooking member is mounted in the recess, and a spring-biased restricting element disposed above the left and right pivots, and pressable by the pressing element when the lower cooking member is disposed in the recess so as to move in a transverse direction relative to the length of the pivot seat to a limiting position, in which, the restricting element is vertically aligned with the left and right pivots, thereby restricting vertical movement of the upper grill unit and the left and right pivots when the upper grill unit is positioned at the closed position.

2. The grill device as defined in claim 1, wherein the restricting element includes a restricting plate that has two opposite ends and two limiting tabs which respectively project from the opposite ends in the transverse direction and which are vertically aligned with the left and right pivots when the restricting element is positioned at the limiting position.

3. The grill device as defined in claim 2, wherein the pivot seat has a space-confining wall that confines the receiving space and that has a rear wall portion, the restricting element further including an inverted U-shaped spring member that has a bight portion connected to the restricting plate, and two opposing arm portions diverging rearwardly from the bight portion to slidably contact the rear wall portion of the space-confining wall so as to urge the restricting element to move from the limiting position to a non-limiting position, in which, the limiting tabs are moved forward to be offset from the left and right pivots upon removal of the lower cooking member from the recess, the spring member being pressable by the pressing element when the lower cooking member is mounted in the recess so as to permit movement of the restricting element to the limiting position.

* * * * *